(12) United States Patent
Masarwa et al.

(10) Patent No.: US 11,641,816 B2
(45) Date of Patent: May 9, 2023

(54) IRRIGATION DEVICE HAVING ROTATABLE SUPPORTS

(71) Applicant: NETAFIM, LTD., Tel Aviv (IL)

(72) Inventors: Abed Masarwa, Taybi (IL); Erez Govrin, Kibbutz Magal (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 17/830,530

(22) Filed: Jun. 2, 2022

(65) Prior Publication Data
US 2022/0312695 A1 Oct. 6, 2022

Related U.S. Application Data

(63) Continuation-in-part of application No. PCT/IB2021/061121, filed on Nov. 30, 2021.

(60) Provisional application No. 63/122,486, filed on Dec. 8, 2020.

(51) Int. Cl.
*A01G 25/02* (2006.01)

(52) U.S. Cl.
CPC .................. *A01G 25/023* (2013.01)

(58) Field of Classification Search
CPC .... A01G 25/023; A01G 25/02; A01G 27/006; B05B 15/622; B05B 15/625
USPC ........................................................ 248/170
See application file for complete search history.

(56) References Cited

U.S. PATENT DOCUMENTS

| 445,510 | A | | 1/1891 | Black | |
|---|---|---|---|---|---|
| 860,054 | A | * | 7/1907 | Pecover | B05B 15/622 239/511 |
| 1,031,176 | A | * | 7/1912 | Gilpin | B05B 15/622 251/324 |
| 1,566,232 | A | * | 12/1925 | Schreiter | B05B 15/622 404/136 |
| 1,659,470 | A | * | 2/1928 | Owen | B05B 1/267 239/581.2 |
| 1,749,302 | A | * | 3/1930 | Rasmusen | B05B 15/622 248/88 |
| 2,025,895 | A | * | 12/1935 | Praeger | B05B 15/625 248/84 |
| 2,711,927 | A | * | 6/1955 | Miller | B05B 15/622 239/588 |
| 2,736,525 | A | * | 2/1956 | Jones | F16L 3/00 248/168 |

(Continued)

FOREIGN PATENT DOCUMENTS

EP 3 332 631 6/2018

OTHER PUBLICATIONS

International Search Report dated Feb. 25, 2022, in counterpart International (PCT) Application No. PCT/IB2021/061121.

(Continued)

*Primary Examiner* — Joseph A Greenlund
(74) *Attorney, Agent, or Firm* — Womble Bond Dickinson (US) LLP

(57) ABSTRACT

An irrigation device has a generally arc-shaped housing defining an opening through which a plant can grow when the device is placed on a ground face during use. The device further includes a plurality of stakes that can be fitted to the housing, wherein each stake can be rotated between a deployed state where the stake projects away from the housing in a position suitable for being placed into the ground and a non-deployed state where the stake is oriented sideways projecting into the opening.

30 Claims, 8 Drawing Sheets

(56) References Cited

U.S. PATENT DOCUMENTS

| | | | | |
|---|---|---|---|---|
| 2,790,403 | A | | 4/1957 | Larsen |
| 2,903,190 | A | * | 9/1959 | Le Deit .................. B05B 1/046 239/521 |
| 3,908,909 | A | * | 9/1975 | Kaatz ....................... B05B 1/20 248/74.3 |
| 4,945,675 | A | * | 8/1990 | Kendrick ............ F21V 21/0824 47/33 |
| 5,803,366 | A | * | 9/1998 | Musso ...................... B05B 3/06 239/289 |
| 5,974,982 | A | * | 11/1999 | Lepper ..................... A47B 3/08 108/131 |
| D481,103 | S | * | 10/2003 | West ................................. D8/1 |
| D488,208 | S | * | 4/2004 | Cook .......................... D23/214 |
| 9,138,757 | B2 | * | 9/2015 | McLarty .................. B05B 1/14 |
| 9,999,894 | B2 | * | 6/2018 | Becktell ................ B05B 15/625 |
| 10,328,663 | B2 | | 6/2019 | Lortscher et al. |
| 10,758,923 | B1 | * | 9/2020 | Oman ....................... B05B 1/16 |
| D923,745 | S | * | 6/2021 | Govrin ........................ D23/214 |
| 11,382,284 | B2 | * | 7/2022 | Mori .................... A01G 25/023 |
| 11,441,704 | B2 | * | 9/2022 | Garza, Jr. ............... F16L 3/003 |
| 2004/0164179 | A1 | * | 8/2004 | Corbett .................. B05B 15/16 239/200 |
| 2012/0000123 | A1 | * | 1/2012 | Donaldson ............... A01G 9/12 47/45 |
| 2012/0080538 | A1 | * | 4/2012 | Reid ..................... A01G 27/006 239/276 |
| 2015/0250110 | A1 | * | 9/2015 | Lo .......................... A01G 25/02 239/581.1 |
| 2018/0125015 | A1 | * | 5/2018 | Marshall .................. A01G 9/02 |
| 2018/0132433 | A1 | * | 5/2018 | Kaminski .............. A01G 27/02 |
| 2019/0134658 | A1 | * | 5/2019 | Cella .................... B05B 15/622 |
| 2020/0016621 | A1 | * | 1/2020 | Chen .................... B05B 15/622 |
| 2021/0040744 | A1 | * | 2/2021 | Aziz ....................... E04D 13/08 |
| 2022/0105532 | A1 | * | 4/2022 | Placencia ............... B05B 15/16 |
| 2022/0128172 | A1 | * | 4/2022 | Harris ..................... F16L 1/028 |
| 2022/0312695 | A1 | * | 10/2022 | Masarwa .............. A01G 25/02 |

OTHER PUBLICATIONS

Written Opinion dated Feb. 25, 2022, in counterpart International (PCT) Application No. PCT/IB2021/061121.

* cited by examiner

IRRIGATION DEVICE HAVING ROTATABLE SUPPORTS

RELATED APPLICATIONS

This is a Continuation-in-Part of International Application No. PCT/IB2021/061121 filed Nov. 30, 2021. Priority is claimed to U.S. Provisional Patent Application No. 63/122,486 filed Dec. 8, 2020. The contents of the aforementioned applications are incorporated by reference in their entirety.

TECHNICAL FIELD

Embodiments of the invention relate to an irrigation device, in particular for providing irrigation a generally pre-defined route.

BACKGROUND

There are many types of irrigation devices suited for providing irrigation along a generally pre-defined route. One example is irrigation devices that are generally arc-shaped so that they can be fitted adjacent a plant generally surrounding the plant to irrigate its roots.

PCT publication No. 2017003861 describes an irrigation device for facilitating growth of plants that includes a mat that is air and water permeable and has an opening through which a plant extends. A slit extends from the opening to a peripheral edge to facilitate placement of the mat around the plant. A drip tube is disposed within the mat between upper and lower surfaces and has an open end connectable to a water source, and a series of emitters along the length thereof permitting water to exit the drip tube and through the lower surface of the mat.

SUMMARY

The following embodiments and aspects thereof are described and illustrated in conjunction with systems, tools and methods which are meant to be exemplary and illustrative, not limiting in scope.

In a first broad aspect of the present invention there is provided an irrigation device comprising a generally arc-shaped housing and a plurality of supports that are pivotally coupled to the housing. The supports are configured to prevent a lower surface of the housing from directly contacting the ground. The supports may be in the form of stakes which are configured to penetrate the ground, or alternatively in the form of legs which are configured to rest on the ground face.

In another broad first aspect of the present invention there is provided an irrigation device comprising a generally arc-shaped housing and a plurality of supports that comprise each a stopper member for maintaining the arc-shaped housing above a soil where it is placed.

Such supports with stopper members may be either pivotally coupled or non-pivotally coupled to the housing of the irrigation device.

In addition, such stopper members may be located in between a tip of each support and its side that connects to the irrigation device's housing, or at or adjacent a tip of the support.

In an embodiment there is provided an irrigation device comprising a generally arc-shaped housing defining an opening through which a plant can grow when the device is placed on a ground face during use, the device further comprising a plurality of supports that can be fitted to the housing, wherein each support can be rotated ("revolved") between a deployed state where the support projects away from the housing in a position suitable for being placed into or on the ground and a non-deployed state where the support is oriented sideways projecting into the opening.

In an embodiment there is also provided a method for irrigating comprising the steps of: providing an irrigation device comprising a generally arc-shaped housing defining an opening and a plurality of supports in the form of stakes that can be fitted to a lower side of the housing, rotating ("revolving") each stake to a deployed state where it projects away from the housing, and placing the irrigation device on a ground face with the stakes penetrating into the ground.

In yet another embodiment there is also provided a method for irrigating comprising the steps of: providing an irrigation device comprising a generally arc-shaped housing defining an opening and a plurality of supports in the form of legs that can be fitted to a lower side of the housing, in a non-hinged manner. However, in some embodiments, the legs may instead be hinged, not unlike the stakes mentioned above.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIGS. 6 to 8B schematically show an embodiment of a support in the form of a stake and an embodiment of an irrigation device using such a stake, respectively;

FIG. 6 shows an exemplary stake;

FIG. 7 shows an embodiment of an irrigation device placed in a planter;

FIG. 8B shows the irrigation device of FIG. 8A in the deployed state, in which its stakes project away from the housing in a position suitable for being placed into or on the ground.

Figure 1:
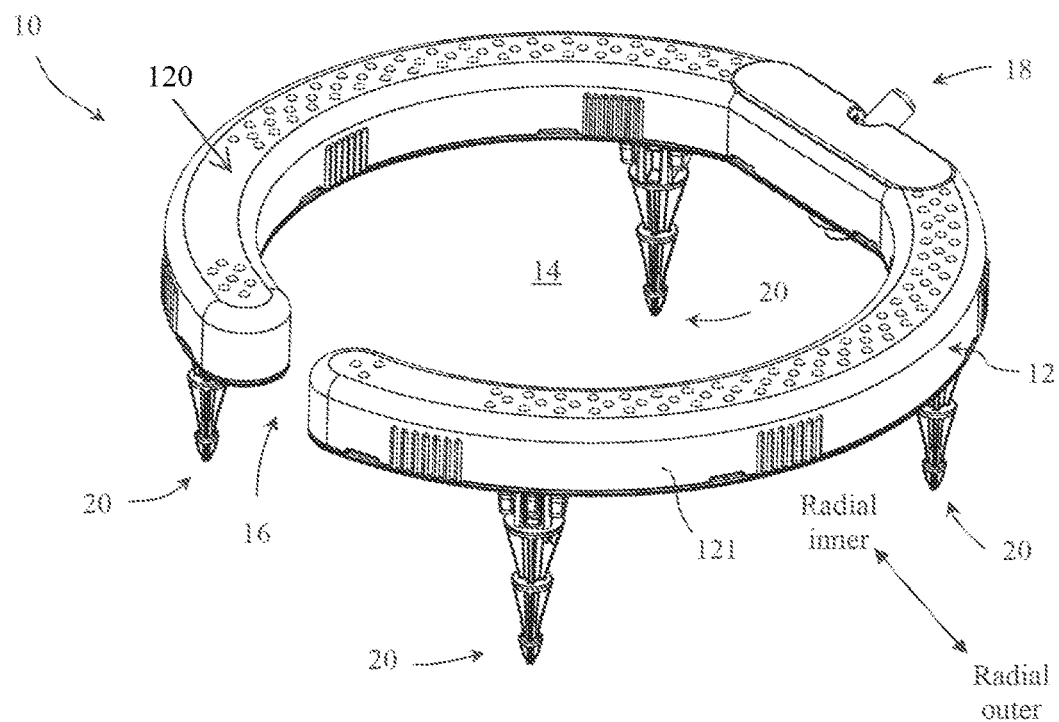
FIGS. 1 and 2 schematically show, respectively, top and bottom perspective views of an embodiment of an irrigation device in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
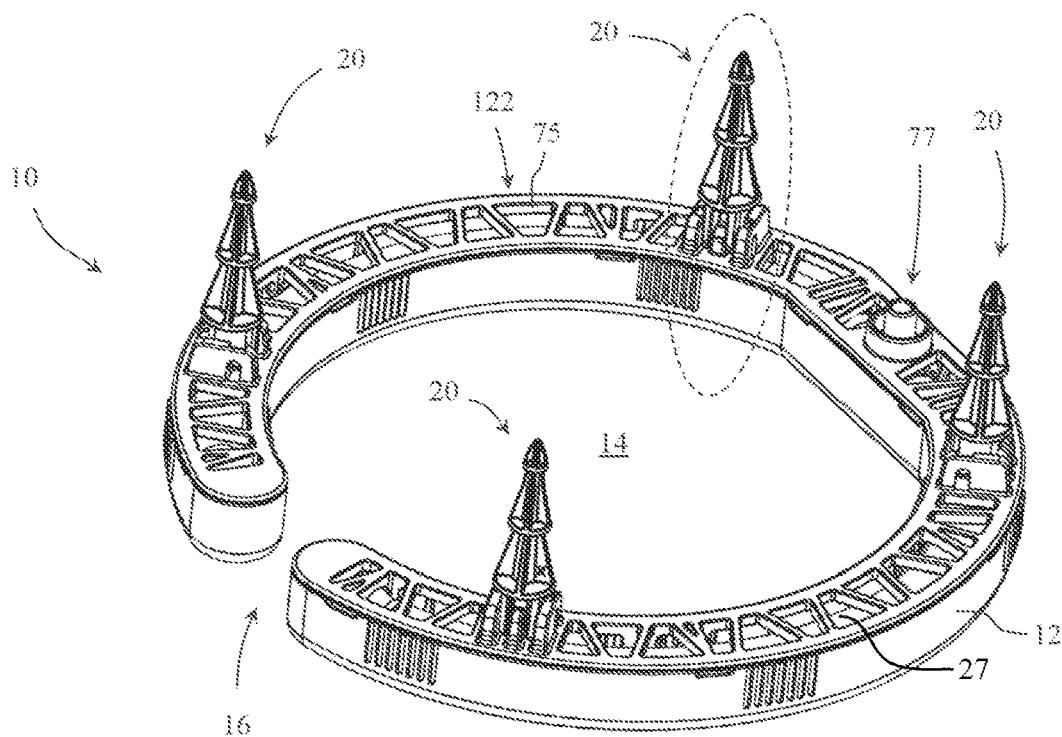

Attention is first drawn to FIGS. 1 and 2 schematically illustrating an irrigation device 10 according to an embodiment of the present invention. Irrigation device 10 includes a generally arc-shaped housing 12 that surrounds an opening 14 through which a plant (see FIG. 7) is arranged to extend. The opening communicates via a slit 16 with a peripheral outer side 121 of the housing to facilitate placement of the irrigation device around a plant.

The irrigation device is provided with an inlet 18, in this example located generally opposite to the slit 16, through which liquid entering the device from an incoming tube (not shown) can flow onwards downstream to be emitted to the ambient environment along the arced extension of the housing, possibly via a drip irrigation pipe segment 27 located within the housing 12.

Irrigation device 10 in this example can be seen being provided with a plurality of supports 20, in this example four supports, which are connected to a lower side 122 of the housing. In the embodiment seen in FIGS. 1-8, the supports 20 are in the form of stakes 20. The stakes in a deployed state are arranged to project downwards from a lower side 122 of the irrigation device's housing to assist in stable and/or firm placement of the device on a ground face by being suitably designed to penetrate into the ground. The lower side 122 of the housing can also be seen in FIG. 2 as being arranged to include openings 75 (in this example generally trapezoid shaped openings) through which liquid emitted by the device can flow towards a ground face upon which the device's lower side 122 is arranged to be adjacently placed during use of the device. Also seen at the lower side of the housing is a possible plug formation 77 suitable for receiving an end of an incoming tube when the device is not in use. Such incoming tube may accordingly be fitted to the device's inlet 18 when the irrigation device is in use.

Figure 3A:
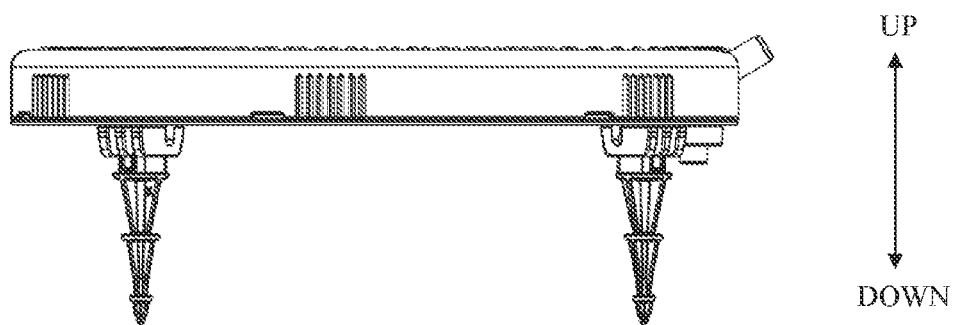
FIGS. 3A to 3C schematically show side views of the irrigation device of FIGS. 1 and 2, during different rotated states of its supports which in this embodiment are in the form of stakes.
Figure 3B:
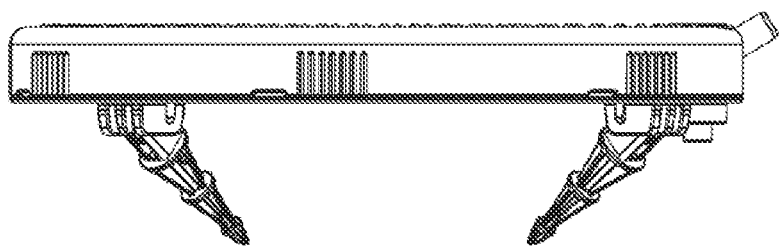
Figure 3C:
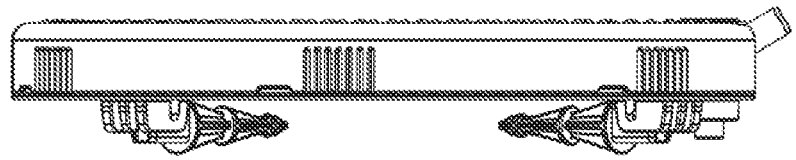
Figure 4A:
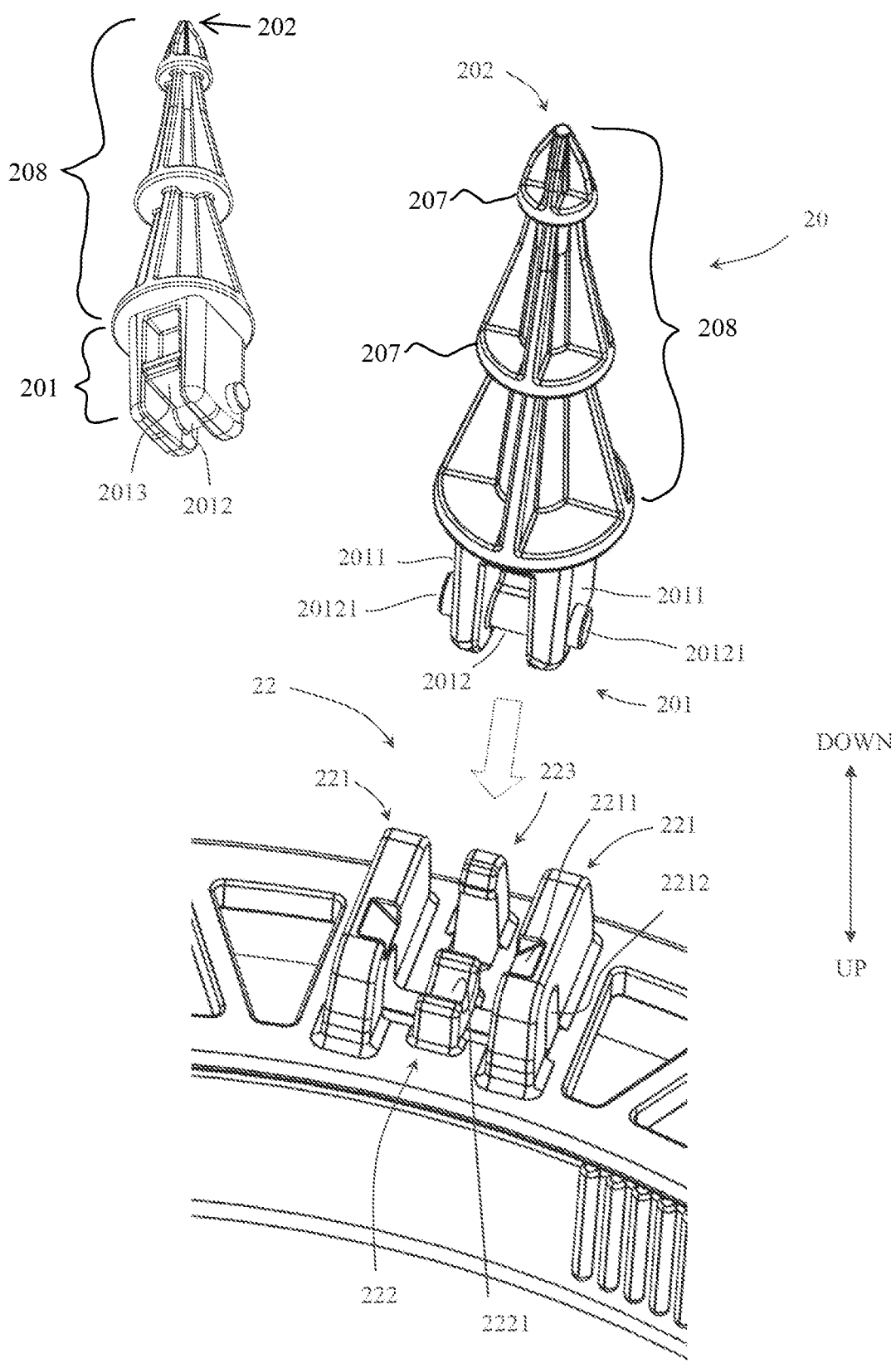
FIGS. 4A and 4B schematically show assembly steps between a support in the form of a stake and a housing of the irrigation device.

Attention is additionally drawn to FIGS. 3A to 3C to illustrate different rotated states of the stakes relative to the device's housing. In the shown example, the stakes may be maneuvered back and forth between a deployed state (see FIG. 3A) where the stakes point downwards and a non-deployed state (see FIG. 3C) where the stakes are folded, in this example to a position where they extend each radially sideways into opening 14. As best seen in FIG. 4A, each stake 20 comprises a base 201 and a spike 208 extending from the base 201 to a tip 202 of the spike. The spike 208, which constitutes that portion of the stake 20 configured to enter the ground during use, may have a tapered shape and one or more laterally extending ribs 207 positioned between the base 201 and the tip 202.

Figure 4B:
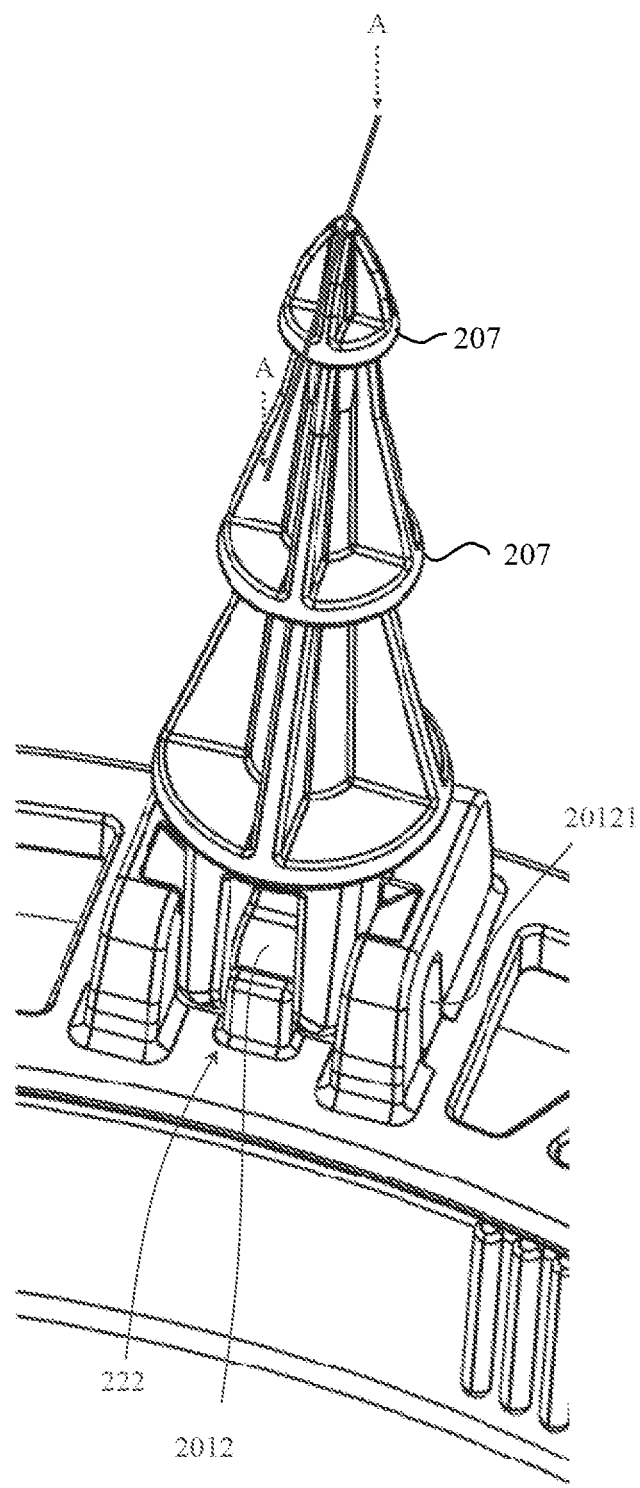

Attention is drawn to FIGS. 4A and 4B exemplifying an option where a stake 20 may be arranged to be manually coupled to a mount 22 (also referred to as a "rest" 22) that is located on the lower side 122 of the device's housing.

Mount 22 in this example can be seen being formed of two side walls 221, a fulcrum 222 located in between the side walls and a stop 223 in the shown example located at a radial outer side of the fulcrum. Fulcrum 222 has a downwardly facing concave face 2221 and the side walls 221 each include a chamfered portion 2211 that tapers upwardly towards the fulcrum and an opening 2212 that is formed through the side wall above the chamfered portion.

Stake 20 can be seen as including the base 201 at its side that connects to the mount 22 and the tip 202 at its side that is designed to lead its penetration into soil. Base 201 in this example includes two sides 2011 and a shaft 2012 that extends between the sides and include end segments 20121 that protrude beyond the sides 2011. As seen in the upper left-hand side of FIG. 4A, the stake's base 201 includes also a tongue member 2013 that projects away from shaft 2012 in a radial outer direction when the stake is in a deployed state.

Coupling between a stake 20 and its respective mount 22 may be performed by manually urging the stake towards the mount 22 with its base 201 leading until each end segment 20121 of the stake's base engages a respective chamfered portion 2211 within the mount.

Pressing the stake further towards the mount 22 urges the side walls 221 of the mount to flex sideways due to engagement between the end segments 20121 and the chamfered portions 2211 until a position where the end segments pass the chamfered portions and snap into the openings formed within the side walls 221, bringing shaft 2012 to a position where it rests upon the concave face of the fulcrum 222 (see FIG. 4B).

Figure 5A:
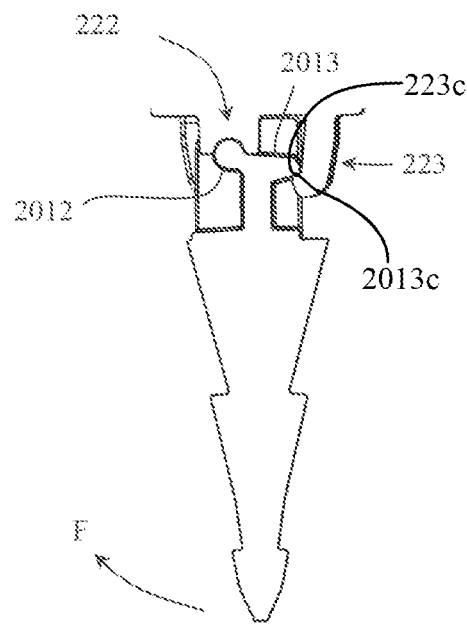
FIGS. 5A to 5C schematically show cross sectional views of an assembled state between a support in the form of a stake and housing of an irrigation device, as taken in plane AA seen in FIG. 4B, where the respective cross sections generally correspond to the rotated states seen in FIGS. 3A to 3C.
Figure 5B:
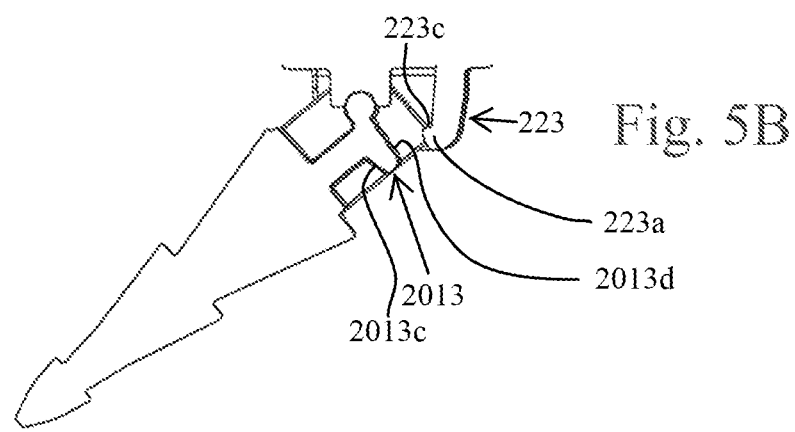
Figure 5C:
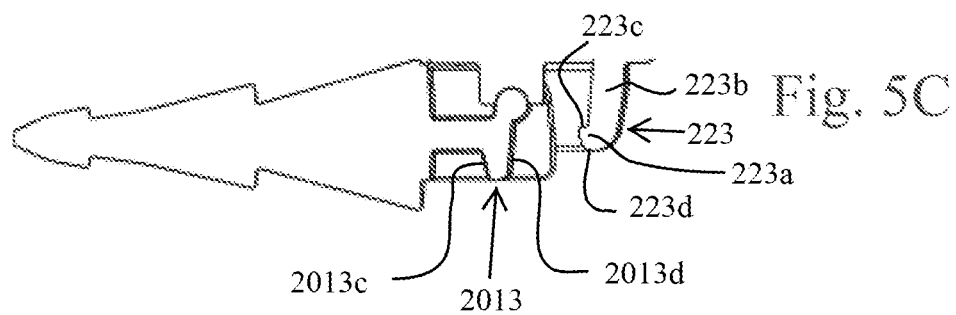

Attention is drawn to the cross-sectional views seen in FIGS. 5A to 5C showing a stake coupled at its base to a respective mount during different rotated states that generally correspond to the rotated states seen in FIGS. 3A to 3C.

In FIG. 5A the stake is seen in a deployed state with its shaft 2012 abutting against the fulcrum 222 of its mount and its tongue member 2013 being engaged with the stop 223 of its mount. Engagement between the tongue member 2013 and stop 223 maintains the stake in its deployed state until sufficient force F is applied (possibly manually applied) in order to urge the stake towards its non-deployed state seen in FIG. 5C. As seen, while rotating a stake back and forth between its deployed and non-deployed states, the shaft 2012 is maintained in abutting engagement with the fulcrum 222.

As seen from the above, in the deployed position with the tongue member 2013 formed on the base 201 engaging the stop 223 formed on the housing, the stake 20 may be considered to be locked, and the stop 223 functions as a detent 223. As best seen in FIG. 5C, the stop 223 formed on the housing comprises housing bracket 223b having a protruding housing lip 223a. The protruding housing lip 223a includes a lip inner surface 223c and a lip outer surface 223d. Meanwhile, opposite sides of the tongue member 2013 formed on the base 201 comprise a base outer abutment surface 2013c and a base inner surface 2013d. In the locked position, the protruding housing lip 223a engages a complementary lip 2013 (e.g., tongue member) provided on the base 201 of the stake 20. Reverting to FIG. 5A, in the deployed position, the housing's lip inner surface 223c clampingly engages the base outer abutment surface 2013c. Furthermore, the shaft 2012, when occupying the fulcrum 222, acts like a hinge. Accordingly, the support/stake 20 is rotatable about a first axis that is fixed relative to the housing, between the non-deployed state and the deployed state.

Figure 6:
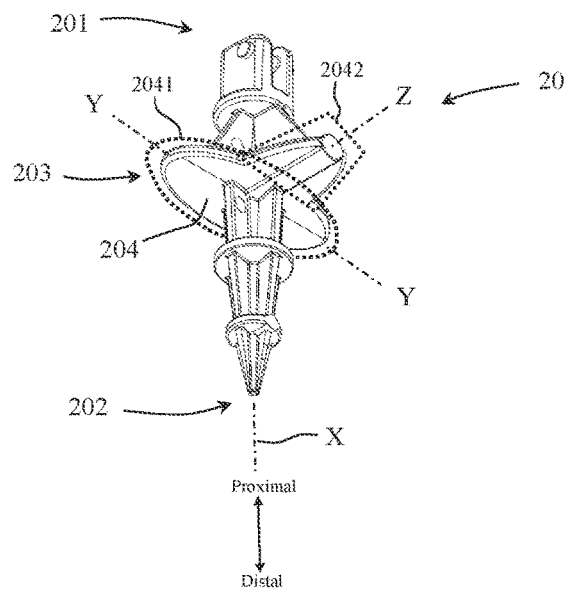

Attention is drawn to FIG. 6 showing an embodiment of a stake 20 of the present invention. Stake 20 extends along a longitudinal axis X from a base 201 at its proximal end (that is designed to connect to an irrigation device—such as that seen in the former figures) to a tip 202 at its distal axial side (that in this example is designed to lead its penetration into soil).

In the example shown, the stake has a stopper member 203 located in between its base 201 and tip 202, which projects generally laterally sideways away from the longitudinal axis X. As seen, the stake tapers in this example in the distal direction towards its tip 202 from a generally planar distally facing abutment face 204 of the stopper member 203.

Abutment face 204 in a view taken along the longitudinal axis X can be seen in this example exhibiting lateral projections forming a generally T-like shape with a first flank 2041 (see indicated within the 'dotted' ellipse) that extends generally along a first lateral axis Y generally orthogonal to the longitudinal axis X and a second flank 2042 (see indicated within the 'dotted' trapezoid) that extends generally along a second lateral axis Z that is generally orthogonal to both axes X and Y.

Figure 7:
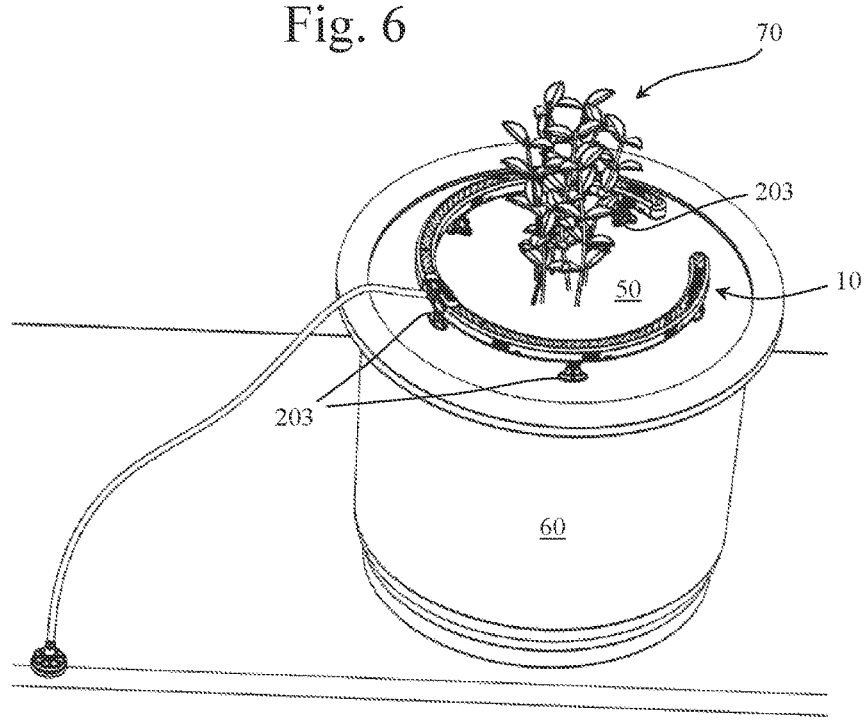

Attention is drawn to FIG. 7 showing an irrigation device 10 such as that seen in the former figures, which is placed upon soil 50 that is housed in this example within a planter 60, to irrigate a plant 70. The irrigation device is supported in its location surrounding the plant with assistance of the stakes, which in this example are securely located penetrating into the soil.

As seen in this example, only a portion of each stake that is located distally below its stopper member 203, penetrates into the soil due to engagement of the stopper member's abutment face 204 with the soil's upper face. This creates a so called 'air barrier' beneath the irrigation device and the soil, which assists in reducing the likelihood of roots penetrating into the irrigation device, an occurrence that may clog the irrigation device over time.

In an aspect of the present invention, formation of the abutment face 204 without any apertures/opening passing therethrough assists in forming a barrier against roots that may try to grow up the stakes towards the water emitted by the irrigation device.

In a further aspect of the present invention derived from tests that were performed, a surface area A1 of abutment face 204 and a cross sectional area A2 of the stake (in a plane perpendicular to the longitudinal axis X) at a location immediately distal and/or proximal to abutment face 204, preferably satisfy a ratio of: A1≥about 2×A2, and more preferably A1≥about 3×A2.

Such ratios define the abutment face 204 as acting as a step-like ledge that further resists the ability of roots arriving from plants within the soil—from growing up along the stakes beyond the stopper member 203 towards the irrigation emitting section(s) of the irrigation device.

Figure 8A:
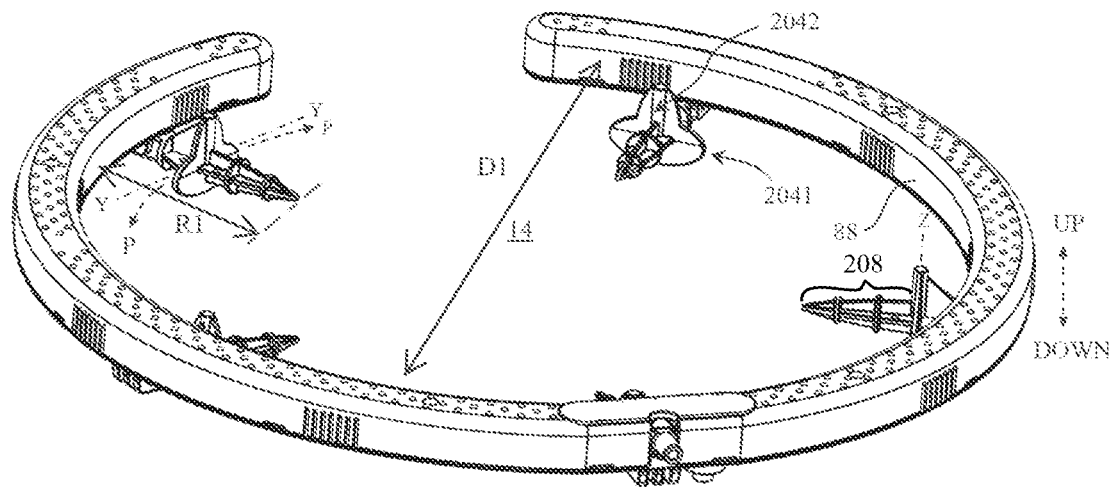
FIG. 8A shows an embodiment of an irrigation device in the non-deployed state, in which its stakes project into the opening.
Figure 8B:
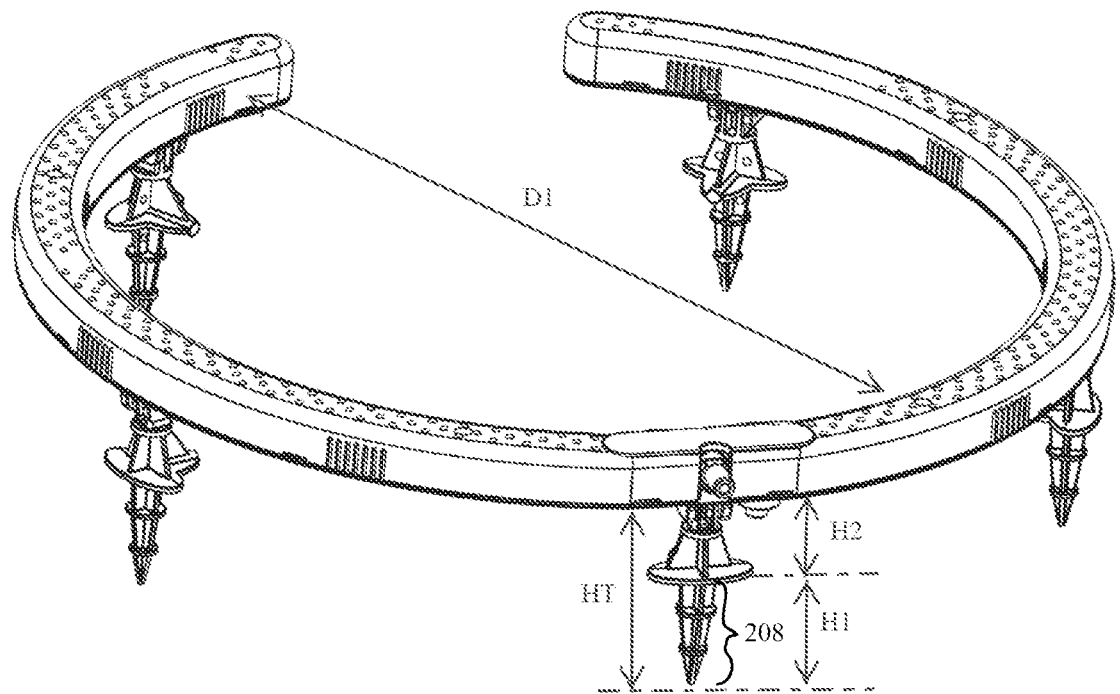

Attention is drawn to FIGS. 8A and 8B illustrating an irrigation device such as that disclosed herein with stakes that can be rotated between a deployed state (see FIG. 8B) where the stakes project away from the irrigation device in a position suitable for penetrating into soil and a non-deployed state (see FIG. 8A) where the stakes are oriented sideways with the entirety of the spikes 208 projecting into the opening 14 of the irrigation device's housing. As seen in FIG. 8A, in the non-deployed state, the tips 202 of the stakes 20 are fully exposed, rather than being at least partially protected by the housing 12.

As seen in the non-deployed state of FIG. 8A, the abutment faces of the stakes used in this state are oriented such that their axially extending first flanks 2041 (along first lateral axis Y), extend generally along and/or tangent to the peripheral direction P of the arc shaped irrigation device, while their axially extending second flanks 2042 (along second lateral axis Z) extend generally upwards alongside a radial inner side 88 of the irrigation device's housing 12 towards the housing's upper side 120 that is distal to where the stakes are connected.

As a result, in this embodiment of the stakes, avoidance of substantial projection of the stopper members 203 beyond the outer boundary of the irrigation device can be obtained in the irrigation device's non-deployed state.

Consequently, stakes with such T-shaped stopper members 203 may assist in forming irrigation devices that can be compact in their deployed state—e.g., in order to assist in stacking such irrigation devices one on top of the other in a compact manner.

It is noted that stopper members 203 as disclosed herein, may be used in stakes that are coupled to irrigation devices such as those disclosed herein in a variety of ways, and not only in a rotating manner as mentioned herein above.

As also seen in FIGS. 8A and 8B, opposing portions of the radial inner side 88 establish a diameter D1 of the opening 14, while the spikes 20 project a radial projection distance R1 into the opening. Comparing these two dimensions, it is evident that the radial projection distance R1 is less than one-half the diameter D1 of the opening, i.e., R1<0.5*D1. More preferably, the radial projection distance R1 is less than one-third the diameter D1 of the opening 14, i.e., R1<(⅓)*D1. In some embodiments, the radial projection distance R1 is less than one-fourth the diameter D1 of the opening 14, i.e., R1<0.25*D1. Having the radial projection distance R1 under one-half the diameter D1 helps prevent the spikes 20 from contacting each other, when all spikes 20 are in their non-deployed state with their tips 202 pointing in a generally radially inward direction into the opening 14, such as when the irrigation device 10 is being shipped or stored.

As seen in FIG. 8B, when in the deployed state, each spike's tip 202 is located a total distance HT below the housing's lower surface 122. Meanwhile, its stopper member is 203 is located a first distance H1 above the tip 202 and a second distance H2 below the housing's lower surface 122. As such, the various stopper members 203 collectively resist insertion of the stakes 20 more than the first distance H1 into the soil, thereby keeping the housing's lower surface 122 a second distance H2 above the soil, with HT=H1+H2 (and ignoring the thickness of the stopper members 203). As seen in FIG. 8B, H1>H2.

Figure 9:
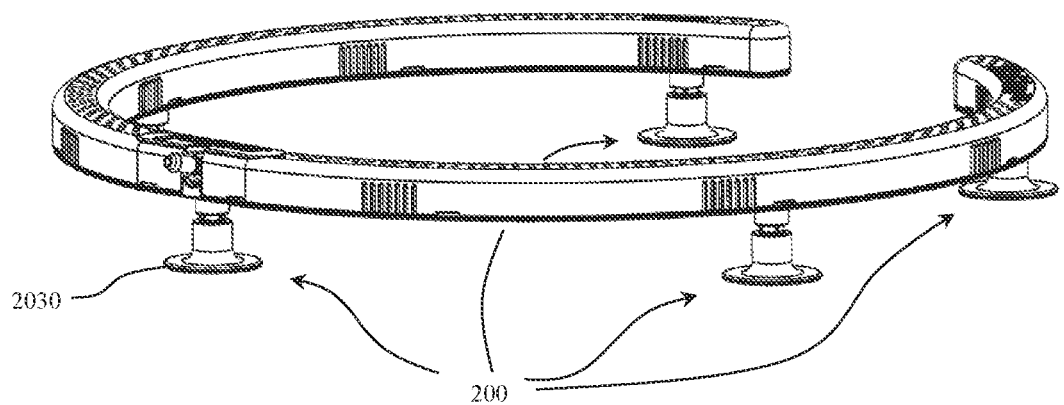
FIG. 9 schematically shows an embodiment of an irrigation device using yet another embodiment of a support, this time in the form of a leg, in accordance with the present invention.

Attention is drawn to FIG. 9 showing an embodiment of an irrigation device such as that shown in the former figures, however with the supports 200 in the form of legs 200 that are fixed in a non-hinged manner to the lower side 122 of the irrigation device's housing. Each such stake 200 can be seen in addition having a respective stopper member 2030 at its distal tip, and hence these stakes 200 simply support the irrigation device upon the soil without necessary penetrating into the soil.

The stopper members 2030 for legs 200 are seen as being generally round shaped, and as in the former described stake 20 may satisfy a ratio of: A1≥about 2×A2, and more preferably A1≥about 3×A2—where such ratios define the abutment faces of these stopper members 2030 as acting as a step-like ledge that further resists the ability of roots arriving from plants within the soil—from growing up along the stakes beyond the stopper member towards the irrigation emitting section(s) of the irrigation device.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. An irrigation device comprising:
    an arc-shaped housing having an upper side, a lower side, a peripheral outer side facing in a radial outer direction, and a radial inner side facing in a radial inner direction, the radial inner side defining an opening through which a plant can grow when the device is placed on a ground face during use;
    a liquid inlet provided on the housing;
    a slit formed through the housing so that the opening communicates with the peripheral outer side of the housing, to facilitate placement of the irrigation device around the plant; and
    a plurality of stakes attached to the housing, each stake extending along a longitudinal axis having a proximal direction and a distal direction, each stake having a base located at a proximal end thereof and a spike extending from the base to a tip located at a distal end thereof, the stake being attached to the housing via said base, the spike constituting that portion of the stake configured to enter into the ground during use; wherein:
    each stake is rotatable between: (a) a non-deployed state in which said each stake is unlocked and the entirety of the spike projects into the opening with its tip fully exposed, and (b) a deployed state in which said each stake is snap fitted into a locked state and projects in a downward direction below the housing's lower side;
    said each stake is configured to rotate from the non-deployed state to the deployed state, upon manually applying a force to the stake in a first rotational direction until the stake engages a stop provided on the housing, and becomes locked; and
    said each stake is further configured to rotate from the deployed state to the non-deployed state, upon manually applying torque to the stake in a second rotational direction which is opposite to the first rotational direction, to release the stake from the stop and become unlocked.

2. The irrigation device of claim 1, further comprising:
    an irrigation pipe segment located within the housing and in fluid communication with the liquid inlet;
    wherein the irrigation pipe segment is configured receive irrigation substances and emit said irrigation substance substantially along an entire length of the arc-shaped housing, when an irrigation substances source is connected to the liquid inlet.

3. The irrigation device of claim 1, further comprising:
    a plurality of mounts provided on the housing's lower side;
    each of said plurality of stakes is rotatably mounted in a respective one of said plurality of mounts, via its base.

4. The irrigation device of claim 3, wherein each of said plurality of stakes is snap fitted to said respective one of said mounts.

5. The irrigation device of claim 3, wherein:
    each stake comprises a shaft member;
    each mount comprises a fulcrum;
    the shaft member is rotatably mounted in the fulcrum;
    rotating a stake between the deployed state and the non-deployed stake comprises pivoting the stake's shaft member relative to the fulcrum.

6. The irrigation device of claim 1, wherein:
    said each stake is hingedly connected to the housing and rotates about a first axis that is fixed relative to the housing, between the non-deployed state and the deployed state.

7. The irrigation device of claim 6, wherein:
    said each stake comprises a tongue member; and
    in the deployed state, the tongue member is engaged to the stop provided on the housing.

8. The irrigation device of claim 7, wherein:
    in the deployed state, the tongue member is snap fitted to the stop.

9. The irrigation device of claim 8, wherein said each stake further comprises a stopper member projecting sideways away from the longitudinal axis, the stopper member comprising an abutment face facing in the distal direction.

10. The irrigation device of claim 9, wherein:
    each stopper member comprises a surface area A1 that faces the distal direction;
    each stake comprises a cross sectional area A2 at a location distal and/or proximal to its stopper member, and $$A1 \geq 2*A2.$$

11. The irrigation device of claim 9, wherein:
    said each stake tapers towards its tip, the tip being configured to penetrate and be inserted into a ground face;
    the stopper member is located a first distance H1 from the tip;
    in the deployed position, the stopper member is spaced apart from the housing's lower side by a second distance H2; and $$H1 > H2.$$

12. The irrigation device of claim 1, wherein:
in the deployed state, said each stake extends a distance HT below the housing's lower side;
in the non-deployed state, said each stake projects a radial projection distance R1 into the opening;
the opening has an opening diameter D1 and
the radial projection distance R1 is less than one-third the opening diameter D1.

13. The irrigation device of claim 1, wherein:
the stop provided on the housing comprises a protruding housing lip which engages a complementary lip provided on the base of said each stake.

14. The irrigation device of claim 13, wherein the spike has a tapered shape and one or more laterally extending ribs between the base and the tip.

15. An irrigation device comprising an arc-shaped housing defining an opening through which a plant can grow when the device is placed on a ground face during use, the device further comprising:
a plurality of stakes fitted to the housing, each stake extending along an axis towards a tip thereof that is distally located from a side of the stake that is fitted to the housing of the irrigation device; wherein:
each stake is rotatable between a deployed state where the stake is snap fitted into a locked state and projects away from the housing in a position suitable for being placed into the ground and a non-deployed state where the stake is oriented sideways projecting into the opening to at least partially overlie the opening with its tip fully exposed;
in the locked state, each stake is snap fitted to a stop formed on the housing, the stop comprising a protruding housing lip which engages a complementary lip provided on a base of said each stake; and
the opening communicates via a slit formed through the housing with a peripheral outer side of the housing to facilitate placement of the irrigation device around the plant.

16. The irrigation device of claim 15, wherein:
the housing comprises a plurality of mounts provided at its lower side, each stake being fitted to a respective one of the mounts;
each mount comprises a fulcrum and each stake comprises a shaft member;
each stake's shaft member is fitted to its respective mount's fulcrum; and
rotating a stake between the deployed state and the non-deployed stake comprises pivoting that stake's shaft member relative to the fulcrum of its respective mount.

17. The irrigation device of claim 16, wherein:
each stake's shaft member is snap fitted to its respective mount's fulcrum.

18. The irrigation device of claim 15, wherein:
rotating a stake in a first rotational direction into its deployed state comprises snap fitting that stake into the locked state that maintains the deployed state in place; and
rotating a stake from a deployed state towards a non-deployed state comprises manually applying torque to that stake in a second rotational direction that is opposite to the first rotational direction in order to release that stake from its locked state.

19. The irrigation device of claim 15, wherein:
at least some of the stakes comprise a stopper member, wherein each stopper member projects sideways away from the axis of its stake and comprises an abutment face that generally faces the distal direction;
each stopper member comprises a surface area A1 that faces the distal direction and each stake comprises a cross sectional area A2 at a location distal and/or proximal to its stopper member, and A1 and A2 satisfy a ratio of A1 being greater than or equal to two times A2 (A1≥2×A2).

20. The irrigation device of claim 15, wherein:
in the deployed state, said each stake extends a distance HT below the housing's lower side;
in the non-deployed state, said each stake projects a radial projection distance R1 into the opening;
the opening has an opening diameter D1 and
the radial projection distance R1 is less than one-third the opening diameter D1.

21. The irrigation device of claim 15, wherein:
each stake comprises a spike constituting that portion of the stake configured to enter into the ground during use; and
in the non-deployed state, each stake is oriented sideways with the entirety of the spike projecting into the opening.

22. The irrigation device of claim 15, wherein:
each stake is hingedly connected to the housing, and rotates about a first axis that is fixed relative to the housing, between the non-deployed state and the deployed state; and
the device further comprises:
an irrigation pipe segment positioned within the housing and in fluid communication with an inlet to the housing, wherein the irrigation pipe segment is configured receive irrigation substances and emit said irrigation substance substantially along an entire length of the arc-shaped housing, when an irrigation substances source is connected to the liquid inlet.

23. An irrigation device comprising an arc-shaped housing defining an opening through which a plant can grow when the device is placed on a ground face during use, the device further comprising:
a plurality of stakes connected to the housing for securing the irrigation device to the ground face, each stake comprising a spike constituting that portion of the stake configured to enter into the ground during use, the spike extending along a longitudinal axis towards a tip thereof that is located away from the housing of the irrigation device; wherein:
each stake is rotatable between (a) a non-deployed state where the stake is oriented sideways with the entirety of the spike projecting into the opening and its tip fully exposed, and (b) a deployed state where the stake projects away from the housing in a downward position suitable for being placed on the ground face;
in the deployed state, each stake is snap fitted into a locked state that maintains the deployed state in place;
in the locked state, each stake is snap fitted to a stop formed on the housing, the stop comprising a protruding housing lip which engages a complementary lip provided on a base of said each stake;
at least some of the stakes comprise a stopper member, wherein each stopper member projects sideways away from the stake's longitudinal axis and comprises an abutment face that generally faces the distal direction; and
tips of stakes comprising stopper members are located farther from the housing than the stopper members.

24. The irrigation device of claim 23, wherein each stopper member comprises a surface area A1 that faces the distal direction and each stake comprises a cross sectional area A2 at a location immediately distal and/or proximal to its stopper member, and A1 and A2 satisfy a ratio of A1 being greater than or equal to two times A2 (A1≥2×A2).

25. An irrigation device comprising an arc-shaped housing defining an opening through which a plant can grow when the device is placed on a ground face during use, the device further comprising a plurality of stakes projecting from the housing, each stake having a tip at an end thereof, wherein:
- the opening communicates via a slit formed through the housing with a peripheral outer side of the housing to facilitate placement of the irrigation device around the plant;
  - each stake is rotatable between (a) a non-deployed state where the stake is oriented sideways with its tip fully exposed, and (b) a deployed state where the stake projects away from the housing in a downward position suitable for being placed into the ground;
  - in the deployed state, each stake is snap fitted into a locked state that maintains the deployed state in place; and
  - in the locked state, each stake is snap fitted to a stop formed on the housing, the stop comprising a protruding housing lip which engages a complementary lip provided on a base of said each stake.

26. The irrigation device of claim 25, wherein:
rotating said each stake from the non-deployed state to the deployed state comprises manually applying a force to the stake in a first rotational direction until the stake enters the locked state; and
rotating the stake from the deployed state to the non-deployed state comprises manually applying torque to the stake in a second rotational direction that is opposite to the first rotational direction in order to release the stake from its locked state.

27. The irrigation device of claim 25, wherein:
at least some of the stakes comprise a stopper member, wherein each stopper member projects sideways away from the stake's longitudinal axis and comprises an abutment face that generally faces the distal direction; and
each stopper member comprises a surface area A1 that faces the distal direction and each stake comprises a cross sectional area A2 at a location distal and/or proximal to its stopper member, and A1 and A2 satisfy a ratio of A1 being greater than or equal to two times A2 (A1≥2×A2).

28. The irrigation device of claim 25, wherein the stake is hingedly connected to the housing.

29. The irrigation device of claim 25, wherein:
each stake comprises a spike constituting that portion of the stake configured to enter into the ground during use; and
in the non-deployed state, each stake is oriented sideways with the entirety of the spike projecting into the opening.

30. The irrigation device of claim 25, wherein:
each stake is hingedly connected to the housing, and rotates about a first axis that is fixed relative to the housing, between the non-deployed state and the deployed state; and
the device further comprises:
an irrigation pipe segment positioned within the housing and in fluid communication with an inlet to the housing, wherein the irrigation pipe segment is configured receive irrigation substances and emit said irrigation substance substantially along an entire length of the arc-shaped housing, when an irrigation substances source is connected to the liquid inlet.

* * * * *